Figure 1A:

Inventor:
Percy Samuel Brandon;
By his attorneys,
Baldwin & Wight

Patented Oct. 12, 1954

2,691,776

UNITED STATES PATENT OFFICE 2,691,776

RADAR SYSTEM OF THE SPECTRUM ANALYZING RECEIVER TYPE

Percy Samuel Brandon, Chelmsford, England, assignor to Marconi's Wireless Telegraph Company Limited, London, England, a company of Great Britain Application October 17, 1950, Serial No. 190,635

Claims priority, application Great Britain November 16, 1949

6 Claims. (Cl. 343—14)

This invention relates to radar systems and more specifically to frequency modulated (FM) radar systems of the so-called spectrum analyzing receiver type.

As is known, in an FM radar system of the type referred to a continuous transmitted wave is periodically and cyclically varied in frequency between predetermined limits and in accordance with a predetermined law of variation. Energy reflected from targets is mixed with some of the energy from the transmitter to produce beat notes whose frequencies will be proportional to the distances away of the reflecting targets. These beat notes are analyzed by a spectrum analyzing receiver which usually comprises an amplifier of predetermined frequency and acceptance band across whose pass band the beat notes are swept by the action of a so-called swept oscillator.

In general the narrower the acceptance band width of the spectrum analyzing receiver of an FM radar system of the type referred to, the higher is the signal-noise ratio at the receiver output. In known systems a narrowing of the receiver acceptance band to obtain a better signal-noise ratio involves a corresponding change in the repetition frequency of the transmitter, i. e. the frequency at which the transmitter repeats its cycle of frequency variation. If it is required to maintain the same resolution the frequency deviation of the transmitter must remain unchanged and accordingly the change in the repetition frequency of the transmitter involves a lowering of the beat note frequencies corresponding to given ranges. Accordingly, with a known radar system of the kind referred to, if it is required to provide the receiver with alternative band widths, provision must be made for different rates of search (when the narrowest band width is in use, the time taken to obtain range information is the longest), for different repetition frequencies of the transmitter and for different ranges of beat notes to be handled by the receiver. These necessities involve great increases in design difficulties and in the complexity and cost of the apparatus. The present invention seeks to overcome these defects and to provide improved FM radar systems of the type referred to in which, in order to vary the signal-noise ratio, changes in the acceptance band width of the spectrum analyzing receiver may be provided for without having to provide for changing the repetition frequency of the transmitter or of the range of beat notes to be handled. The invention may also be utilized to provide an improved radar system of the kind referred to wherein there is a plurality of receivers operated simultaneously by the same signals, each receiver giving a desired resolution (generally, though not necessarily, the same for all receivers) but each covering a different proportion of the range (of distances to be searched) in the same time. As will be seen the smaller the proportion covered by any receiver, the narrower will be its acceptance band width and the higher its signal-noise ratio. By suitable switching provision the receivers of better signal-noise ratio could be arranged to cover any part of the range at will. Another advantage of the invention is that it facilitates the use of a high transmitter repetition frequency. One of the defects of the use of a low repetition frequency, with consequent low frequency beat notes, is that, in the case of moving targets seriously erroneous indications of distance may be given as a result of the shifting of the true beat note frequencies by the Doppler shift frequencies. The higher the range of beat notes the less the liability to errors from this cause. It is therefore an important practical advantage of the invention that it allows of the use of a high repetition frequency, with consequent high values of beat note frequencies simultaneously with a receiver of narrow acceptance band and high signal-noise ratio.

According to this invention a radar system of the kind referred to is characterized by the provision of means for deriving, from the produced beat notes, pulses of beat note energy occurring at a frequency which is a sub-multiple of the transmitter repetition frequency and feeding said pulses to the receiver proper.

In one way of carrying out the invention, the produced beat notes, which are obtained in any manner known per se, are passed to a grain modulator the grain of which is varied synchronously with the repetition cycle of the transmitter so as normally to produce an output which consists of pulses of beat notes energy repeated at the transmitter repetition frequency. When desired, however, only alternate pulses, or one pulse in every three, or one pulse in any other desired number, are permitted to operate the receiver proper, these utilized pulses being maintained unchanged in shape and size. The use of a gain modulator, operating at the transmitter repetition frequency, is not per se part of the invention which resides in the selection of pulses occurring at a sub-multiple of the transmitter repetition frequency.

Figure 1B:
Figure 1C:
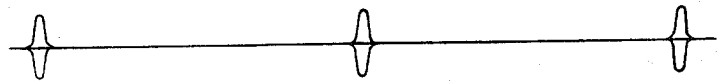
Figure 2:
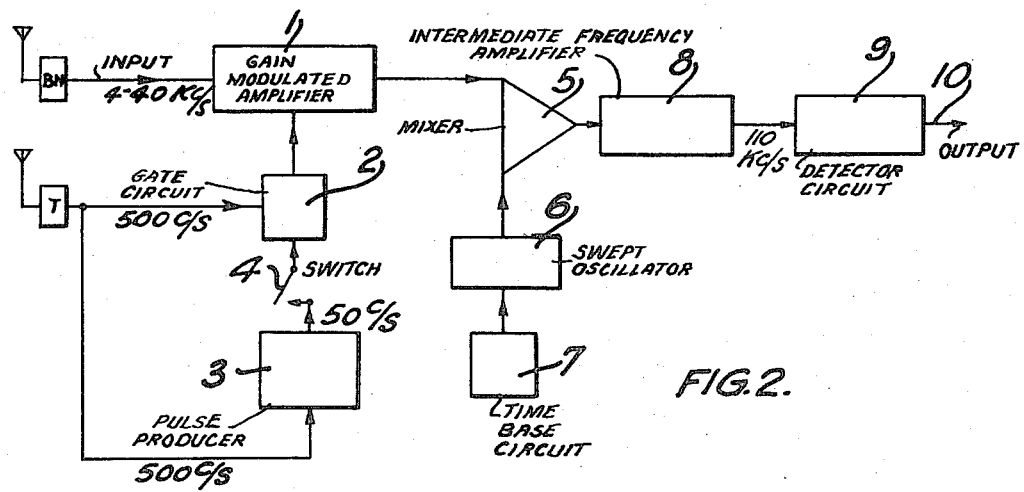

The invention is illustrated in and further explained in connection with the accompanying drawings in which Figs. 1a, 1b, 1c are explanatory graphical figures and Fig. 2 is a block diagram illustrating one embodiment of the invention.

To give practical figures of a typical embodiment of the invention, consider an FM radar system with a transmitter operating at a repetition frequency of 500 c./s. and using, on its receiver side, a gain modulator producing, at its output terminals, pulses of beat note energy occurring at 500 c./s. This is graphically represented in Figs. 1a and 1b in the former of which transmitter frequency (ordinates) is plotted against time and in the latter of which the produced beat note signal from the gain modulator (ordinates) is plotted against time. If the pulses of Fig. 1b were fed to a receiver proper having an acceptance band width of 500 c./s. it might take 1/20 of a second to search a given range of target distances. If now, in accordance with this invention and as shown in Fig. 1c the apparatus is so arranged that identical pulses, occurring, however, at a reduced frequency of 50 c./s. (instead of 500 c./s.) are fed to the receiver proper, the input to the receiver proper will be the same as that which would be obtained were the system one operating with a transmitter repetition frequency of 50 c./s. and ten times the actual transmitter frequency deviation, with the resolution also degraded ten times. Accordingly the acceptance band width can be reduced to 50 c./s. while the range of target distances above mentioned as requiring 1/20 of a second to search, will require 1/2 second to search.

In the embodiment of the invention represented in Fig. 2 beat notes produced by any suitable apparatus (not shown) as well known in an FM radar system, are fed to a gain modulated amplifier 1. Assume that the transmitter repetition frequency is 500 c./s. and that the beat notes to be handled lie between 4 and 40 kc./s. The gain modulated amplifier is controlled by a gate circuit arrangement 2 to which is fed a 500 c./s. sine wave input synchronized by the transmitter repetition frequency. This input can, however, be fed when desired to a pulse producer 3 adapted to produce pulses each 1/500 of a second long at 50 c./s. thus synchronized with the transmitter repetition frequency. The output from pulse producer 3 is applied to the contacts of a switch 4 which when closed supplies the said 50 c./s. output from pulse producer 3 to control the gate circuit arrangement 2 and when opened does not. The output from the gain modulated amplifier 1 is fed to a mixer 5 whose second input is supplied by a swept oscillator 6 operating over the range of frequencies of 114–150 kc./s. This oscillator is controlled by a time base circuit 7 which can be operated at either 20 c./s. or 2 c./s. The mixer output is passed to an intermediate frequency (I. F.) amplifier 8 operating at 110 kc./s. and which can be operated with an acceptance band width of 500 c./s. or 50 c./s. The output from this amplifier is detected by known apparatus at 9 and fed out at 10 to operate apparatus (not shown) for target display purposes in any well known way.

When the switch 4 is open, the oscillator time base 7 is set for 20 c./s. and the I. F. amplifier 8 is set with an acceptance band width of 500 c./s. the gain modulated amplifier 1 is "open" every 1/500 of a second. When the switch is closed, an improvement of 10 db in the signal-noise ratio is obtained for the gain modulated amplifier 1 is now open every 1/50 of a second for the same length of time as before, the oscillator 7 sweeps out its cycle every 1/2 sec. and the band width of the I. F. amplifier 8 is only 50 c./s.

As will be seen the gain modulation is obtained from a 500 c./s. sine wave source (not shown) synchronized with the transmitter repetition frequency for "normal" working (i. e. with a band-width of 500 c./s. in the I. F. amplifier) but, for high signal-noise ratio working, this input is passed through a gate 2 which is opened for the right 1/500 of a second in each 1/50 of a second, this gate being controlled by the pulse producer 3 which may be a multi-vibrator or other circuit giving 1/500 second square pulses every 1/50 of a second synchronized by the transmitter repetition frequency.

I claim:

1. In a radar system of the spectrum analyzing receiver type wherein a continuous uninterrupted transmitted wave is periodically and cyclically varied in frequency between predetermined limits and in accordance with a predetermined law of variation and continuous uninterrupted wave energy reflected from targets is mixed with some of the energy from the transmitter to produce beat notes which are analyzed in said spectrum analyzing receiver; gain control means for deriving, from the produced beat notes, pulses of beat note energy occurring at a frequency which is a sub-multiple of the transmitter repetition frequency and means for feeding said pulses to the receiver proper.

2. In a radar system of the spectrum analyzing receiver type wherein a continuous uninterrupted transmitted wave is periodically and cyclically varied in frequency between predetermined limits and in accordance with a predetermined law of variation and continuous uninterrupted wave energy reflected from targets is mixed with some of the energy from the transmitter to produce beat notes which are analyzed in said spectrum analyzing receiver; a gain modulator, means for passing the produced beat notes thereto, means varying the gain of said modulator synchronously with the repetition cycle of the transmitter normally to produce an output consisting of pulses of beat notes energy repeated at the transmitter repetition frequency, and means, operable to permit only one pulse, in a predetermined number of said pulses, to operate the receiver proper.

3. In a radar system of the spectrum analyzing receiver type wherein a continuous uninterrupted transmitted wave is periodically and cyclically varied in frequency between predetermined limits and in accordance with a predetermined law of variation and continuous uninterrupted wave energy reflected from targets is mixed with some of the energy from the transmitter to produce beat notes which are analyzed in said spectrum analyzing receiver; a gain modulated amplifier, means feeding the produced beat notes to said amplifier; gate circuit means for controlling the gain of said amplifier in synchronism with the transmitter repetition frequency either at said frequency or at an integral fraction thereof, at will; swept oscillator means operable at a predetermined sweeping frequency or at the same integral fraction thereof, at will; a mixer adapted and connected to mix the swept oscillator output with the gain modulated amplifier output; and intermediate frequency amplifying means fed from said mixer and having an acceptance pass band whose frequency width can be made either a predetermined width or the same integral fraction thereof, at will.

4. A radar system as set forth in claim 3 wherein the gate circuit arrangement is connected to receive either a substantially sinusoidal wave synchronized with the transmitter repetition frequency and of the same frequency or a pulsed input of said fraction of said repetition frequency and derived from a pulse producer synchronized by said sinusoidal wave.

5. A radar system as set forth in claim 3 wherein the swept oscillator is controlled by a time base arranged to operate either at a predetermined frequency or at said fraction thereof, at will.

6. A radar system as set forth in claim 3 wherein the gate circuit arrangement is connected to receive either a substantially sinusoidal wave synchronized with the transmitter repetition frequency and of the same frequency or a pulsed input of said fraction of said repetition frequency and derived from a pulse producer synchronized by said sinusoidal wave, and wherein the swept oscillator is controlled by a time base arranged to operate either at a predetermined frequency or at said fraction thereof, at will.

References Cited in the file of this patent

UNITED STATES PATENTS

| Number | Name | Date |
| --- | --- | --- |
| 2,485,583 | Ginzton | Oct. 25, 1949 |
| 2,508,400 | Kiebert | May 23, 1950 |
| 2,522,367 | Guanella | Sept. 12, 1950 |
| 2,524,282 | Blitz | Oct. 3, 1950 |
| 2,542,182 | Crump | Feb. 20, 1951 |